United States Patent [19]

Klan

[11] Patent Number: 4,563,738

[45] Date of Patent: Jan. 7, 1986

[54] DATA PROCESSING SYSTEM HAVING A CENTRAL MAIN MEMORY AND A PLURALITY OF PROCESSOR UNITS CONNECTED IN SERIES

[75] Inventor: Friedrich Klan, Taufkirchen, Fed. Rep. of Germany

[73] Assignee: Siemens Aktiengesellschaft, Berlin & Munich, Fed. Rep. of Germany

[21] Appl. No.: 442,903

[22] Filed: Nov. 19, 1982

[30] Foreign Application Priority Data

Dec. 23, 1981 [DE] Fed. Rep. of Germany ....... 3151120

[51] Int. Cl.⁴ .......................... G06F 3/00; G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,508,206 | 4/1970 | Norberg | 364/200 |
| 3,940,743 | 2/1976 | Fitzgerald | 364/200 |
| 4,096,571 | 6/1978 | Vader Mey | 364/200 |
| 4,177,514 | 12/1979 | Rupp | 364/200 |
| 4,240,143 | 12/1980 | Besemer et al. | 364/200 |
| 4,257,095 | 3/1981 | Nadir | 364/200 |

FOREIGN PATENT DOCUMENTS

| | | |
|---|---|---|
| 2845218 | 4/1980 | Fed. Rep. of Germany . |
| 1483903 | 8/1977 | United Kingdom . |

OTHER PUBLICATIONS

*Computer Dictionary and Handbook* Sippl and Sippl, Howard W. Sams & Co. Inc., 1972, pp. 261 and 487.
Leipold et al., "Organisation des Nachrichtenverkehrs zwischen Zentral-einheiten und peripheren Einheiten in Datenverarbeitungssystemen", Elektronishche Rechenanlagen, vol. 11, No. 3, 1969, pp. 151-161.
Both, R., "Einfluss der Prozessor-Speicher-Verbindungssystems auf die Leistung von Multiprozessor-Anlagen", Elektronishce Rechenanlagen, vol. 23, No. 3, 1981, pp. 107-115.

*Primary Examiner*—Harvey E. Springborn
*Attorney, Agent, or Firm*—Hill, Van Santen, Steadman & Simpson

[57] ABSTRACT

For the purpose of connecting a plurality of independent processor units to a single port of a main memory, the processor units are connected in series over individual interface controls, whereby the interfaces are expanded in comparison to the port interface without the interface conditions for the port being changed. The interface controls operate in reciprocal dependency on one another so that the memory access request arising within the processor unit chain becomes effective in individual succession by way of a reciprocal inhibiting without address control, whereby variable connector controls in the interface lines determine the transmission path of both directions between the main memory and the respectively active processor depending upon status signals which, among other things, are influenced by interface signals. Termination of a write operation and clear down of a completed connection occurs by way of an internal interface line of the chain circuit. Given a read operation, the clear down of the connection path to the memory for the request already occurs with the beginning of the read data transmission given completion of the return connection path. For an additional lock mode, two additional internal interface lines are provided in conjunction with a monitoring and inhibit control in each interface control.

9 Claims, 12 Drawing Figures

DATA PROCESSING SYSTEM HAVING A CENTRAL MAIN MEMORY AND A PLURALITY OF PROCESSOR UNITS CONNECTED IN SERIES

BACKGROUND OF THE INVENTION

1. Field of the Invention

The present invention relates to a data processing system, and more particularly to such a system having a main memory which has a series of ports each for connection to a respectively independent processor unit, for example, a central processing unit and an input/output unit.

2. Description of the Prior Art

Such data processing systems are known for multi-processor systems, for example, from "Elektronische Rechenanlagen" Vol. 11, No. 3, 1969, pp. 151-161 and Vol. 23, No. 3, 1981, pp. 107-115. It can occur, given such data processing systems, that the plurality of originally-provided ports of a main memory no longer suffices in the course of time in order, for example, to be able to connect even further input/output units as independent processor units. On the other hand, when additional ports which are not initially required are provided, a considerable excess initial cost is involved.

SUMMARY OF THE INVENTION

It is therefore the object of the present invention to provide a data processing system which enables the connection of a plurality of processors to a single port.

The above object is achieved, according to the present invention, in a data processing system having a main memory which has a plurality of ports each for connection to a respective independent processor unit, for example, a central processing unit, or an input/output unit, in that, for the purpose of connecting a plurality of processor units to a single port, the processor units form a chain circuit and exhibit identical interface controls which monitor and control the terminals of the identical interfaces for all processors of the chain circuit in both directions, whereby the plurality of interface terminals is expanded in comparison to that of the port interface. The individual interface controls operate in mutual dependence upon one another and the request for the main memory arising in the processor units of the chain circuit are permitted to take effect in individual succession by a reciprocal inhibition without address as though only a single processor were connected to the port of the main memory. For the purpose of dealing with the access to the port and for the execution of the respectively-requested memory operation, variable connector controls are provided in those interface lines of each processor of the chain circuit which control the memory traffic, the variable connector controls, depending upon status signals influenced under certain conditions by interface signals either forwarding incoming interface signals or, given the active status of its own processor unit inhibiting such signals or, respectively, forwarding its own intrinsic signals. Accordingly, a plurality of processor units equipped with identical interface controls can be connected in series, whereby the concatenated interfaces largely correspond to the port interface and whereby, and as a result of the mutual dependency of the individual interface controls in conjunction with the connector controls in the interface lines, is guaranteed that, without changing the port interface and without a higher-order, address-control access device, the processor unit chain can be serviced by the port in the same manner as a single, connected processor unit.

The new type of chain connection of processor units is not comparable to chain arrangements such as are considered and, described, for example, in the German Letters Pat. No. 2,348,002 and its English equivalent, Great Britain Pat. No. 14 83 903, since all of these known change arrangements operate, in the one or another form, with separate selection lines and selection mechanisms of a higher-order control for the completion of connection between the port and the respective processor unit. In contrast, given the present invention, no selection lines are required between the memory port and the individual processor units of the chain connection for sequencing the normal memory traffic and all chain processor units are identically designed so that the chain can be expanded, as required, on a module-like basis.

Other features of the invention are also provided. These particularly relate to the sequence of the completion of connection between one of the processor units and the port for the initiation of a memory operation and of the completion of connection, independent thereof, for the transmission of data read from the memory to the processor unit upon exploitation of existing interface signals which are employed in an advantageous manner for the switch control in the individual interface controls. Other features relate to special instances such as, for example, the lock control given the LOCK mode of the port or such as the retransmission of typographic error signals when these cannnot be perceived in time before the cleardown of the connection.

BRIEF DESCRIPTION OF THE DRAWINGS

Other objects, features and advantages of the invention, will be best understood from the following detailed description, taken in conjunction with the accompanying drawings on which.

DESCRIPTION OF THE PREFERRED EMBODIMENTS

Figure 1:
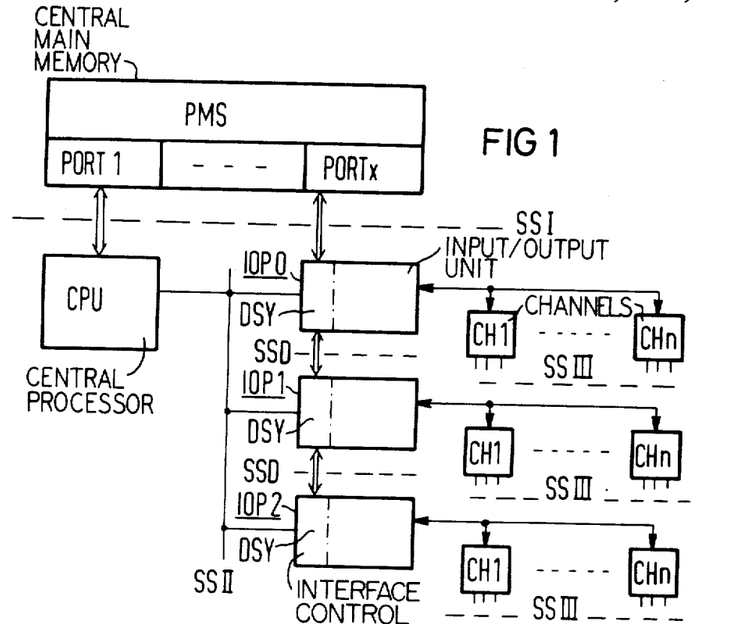
FIG. 1 is a block diagram of a data processing system constructed in accordance with the present invention and having the essential interfaces.

Based on FIG. 2 from the publication "Elektronische Rechenanlagen" Vol. 11, No. 3, 1969, Page 152, FIG. 1 illustrates the structure of a data processing system having a main memory PMS which comprises a plurality of ports PORT1–PORTx for the connection of independent processor units. A central processor unit CPU is connected to the port PORT1 and, instead of a single input/output processor unit IOP, a chain connection of a plurality of input/output processor units IOP0–IOP2 is provided, according to the invention, and connected to the port PORTx. All of the input/output processor units of the chain connection are a matter of independent processor units which can, for example, be designed according to the German allowed and published application No. 2,845,218. The peripheral devices (not illustrated) to be serviced by the individual input/output processor units IOP0–IOP2 are connected to the respective input/output processor unit by way of the channels CH1–CHn.

The concatenation of the individual processor input/output units IOP0–IOP2 occurs over identical interface controls DSY individually assigned to the input/output processor units, the interface controls DSY monitoring and controlling the interface connections provided for each input/output processor unit. Between the individual input/output processor units IOP-0–IOP2, are the interfaces SSD, whereas an interface SSI is provided at the terminal side of the input/output processor unit IOP0 to the port PORTx of the main memory PMS, this being identical for all port terminals. In addition, the central processor unit CPU and the individual input/output processor units IOP0–IOP2 are coupled over an internal interface SSII and the connection of the individual peripheral controls and devices occurs over the interfaces SSIII to the individual channel controls CH1–CHn.

Figure 2:
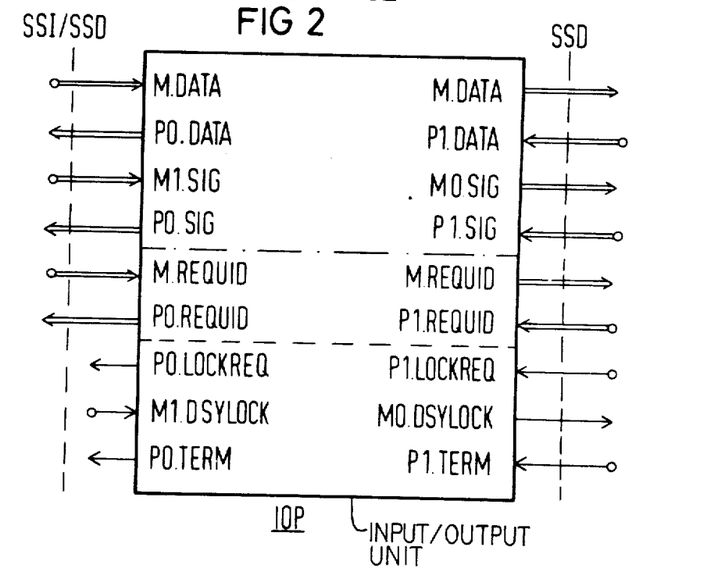
FIG. 2 illustrates a processor unit of the chain with an overview of its interface connections or the concatenation configuration.

The interface connections for the individual input/output processor units IOP are combined, group-wise, in FIG. 2. Thereby, two groups of interface connections be discriminated, in particular, the interface connections in the upper portion of FIG. 2 which are a component of the port interface SSI at the same time and, in addition, the interface connections in the lower portion of FIG. 2 which are only necessary for the chain control and, therefore, are only required within a chain connection. It is thereby a matter of three interface lines, in addition to the interface lines of the port, whereby the line TERM is absolutely necessary for the chain control, whereas the two lines LOCKREQ and DSYLOCK are only required when the port provides a LOCK mode. Two further line groups, M.REQUID and PO.REQUID, P1.REQUID which supply a recognition identification are only additionally required when the port interface SSI does not already provide such lines. The remaining line groups in the upper portion of FIG. 2, namely, M.DATA for the data from the main memory PMS, PO.DATA, P1.DATA for the data from the input/output processor unit to the main memory, M1.SIG, M0.SIG for the memory signals and PO.SIG, P1.SIG for processing signals are normally a component of each memory interface. The partially-differing designations of the two sides of the connections of the individual interface lines or interface line groups are intended to print out that incoming data or signals are, under certain conditions, retransmitted unaltered.

Figure 3:
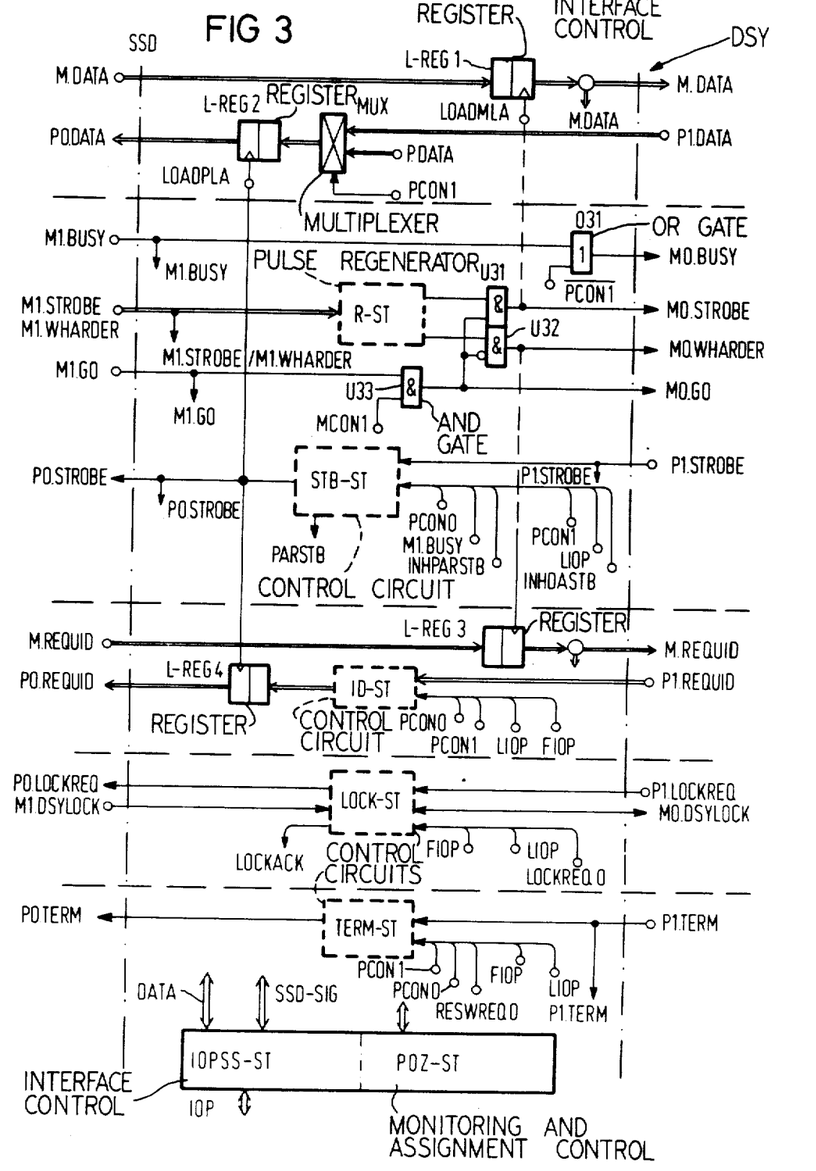
FIG. 3 is a circuit diagram of an interface control with the various interface terminals according to FIGS. 1 and 2.

FIG. 3 illustrates, in a schematic block diagram, the interface controls DSY provided in each of the input/output processor units IOP0–IOP2 with the interface connections essential for the control of the concatenation circuit given retention of the grouping of the interface lines illustrated in FIG. 2. Thereby, the monitoring and assignment control POZ-ST, only indicated with a box in the lower portion of FIG. 3, is of decisive significance for the control sequence within the interface control DSY, the monitoring and assignment control POZ-ST closely cooperating at the other side with the interface control IOPSS-ST for the connected input/output processor unit IOP. For an understanding of the interface control DSY according to FIG. 3, therefore, the monitoring control POZ-ST will be explained first in greater detail on the basis of FIG. 4.

Figure 4:
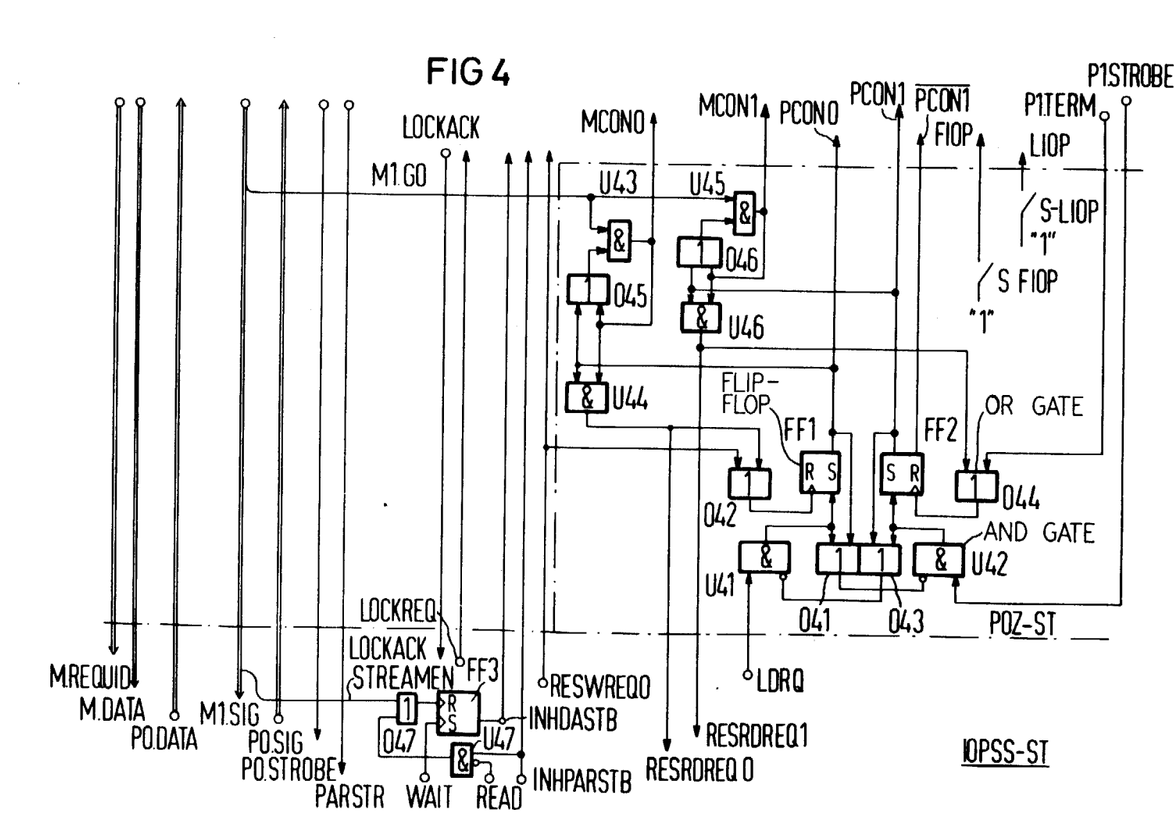
FIG. 4 is a circuit diagram of the monitoring device for retransmitting requests with the control signals for the remaining interface control and the connected processor unit.

Referring to FIG. 4, the control POZ-ST is illustrated as being organized in two portions, in particular, the two flip-flops FF1 and FF2 with the appertaining AND gates U41 and U42 and the OR gates O41–O44 for monitoring the pending requests for completion of a connection to the memory port as the one portion and the AND gates U43–U46 and the OR gates O45 and O46 for setting the path for the data and signals to be transmitted from the memory port as the other portion. Added thereto are two control switches S-FIOP and S-LIOP which respectively identify whether the connected processor is the respectively first or the respectively last processor within the chain connection, this being indicated by the corresponding signals FIOP for the first processor and LIOP for the last processor.

The control POZ-ST is to monitor two respective requests, namely, the request LDREQ supplied from its own processor over its interface control IOPSS-ST and the request deriving from one of the processor units following in the chain and characterized by the signal P1.STOBE. Therefore, the valid character accompanying the transmission of processor unit data to the port is employed for the request of a following processor unit. These requests are treated in an entirely equivalent manner; therefore, none of the requests is prioritized so that the request arriving first takes effect and influences the connection controls of the interface control DSY with the status signals triggered. These status signals are derived from the flip-flops FF1 and FF2, whereby the flip-flop FF1 signals the acceptance of its own request with the signal PCON0 and the flip-flop FF2 signals the acceptance of the external request with the signal PCON1. The drive of the setting inputs of the flip-flops FF1 and FF2 therefore occurs by way of the AND gate U41 or, respectively, the AND gate U42 which can be reciprocally inhibited by way of an inverted control input so that the requests LDREQ or, respectively, P1.STROBE pending over the other signal input cannot at first take effect until the flip-flops are again reset.

Controlled by the OR gates O42 or, respectively, O44 preceding the reset inputs, the resetting of the flip-flops FF1 and FF2 occurs either at the end of a write operation (this being indicated given an internal request by the signal RESWREQ0 from the interface control IOPSS-ST or, on the other hand, given an external request, by the incoming interface signal P1.TERM) or at the end of a read operation depending on the signals RESRDREQO or, respectively, RESRDREQ1 which are supplied by the second portion of the control POZ-ST. These signals are first triggered with the interface signal M1.GO transmitted from the main memory PMS which is transmitted during the entire read data transmission and thereby accompanies the strobe pulses for the read data. This signal simultaneously influences the two AND gates U43 and U45 which are selected depending on the flip-flop signals PCONO or PCON1. The status signal MCONO derived in this manner characterizes the end of the connection path for read data transmitted from the main memory PMS which, accordingly, are to be supplied to the internal processor, whereas the other status signal MCON1 indicates that the received read data are to be retransmitted to a following processor unit. By way of the AND gates U44 and U46, the control signals RESRDREQO and RESRDREQ1 indicating the read data transmission are also derived from the status signals.

In this context, a characteristic of the control POZ-ST will be pointed out which is of significance for the overall memory traffic of the chain circuit. The flip-flops FF1 and FF2 set by a request, in particular, are already reset with the beginning of the read data transmission so that new request can already be accepted parallel to the read data transmission and, therefore, the connection path for data and signals to the main memory can already be through-connected for a new memory operation when the connection path for the read data transmission completed in the reverse direction is still operable.

Further indicated in a lower portion of FIG. 4 are the signals which are to be exchanged between the interface control DSY for the chain circuit and the processor interface control IOPSS-ST within the framework of the memory operations.

Returning to FIG. 3, the operations of the interface connections of the same name will be explained in greater detail as are necessary for an understanding of the invention.

The data M.DATA supplied from the main memory PMS are supplied to a register L-REG1 and are respectively forwarded with a control pulse LOADMLA derived from the validity character MO.STROBE so that they can be accepted both by the following processor over the interface connection and by the internal processor. The analogous case applies to the processor data PO.DATA to be transmitted to the main memory .PMS, whereby a control pulse LOADPLA is derived for the forwarding from the appertaining validity character PO.STROBE. Since two data sources are available for the drive of the appertaining register L-REG2, in particular, that from the internal processor and that from the following processor unit at the input P1.DATA, a multiplexer MUX precedes the register L-REG2, the multiplexer, depending on the status signal PCON1, through-connecting either the one or the other data line group.

Of the main memory signals, only four are shown with their interface connections. These are the signals BUSY, STROBE, WHARDER and GO which have the following denotations:

M1.BUSY: The main memory indicates with this signal that it cannot accept any information at the time. It is forwarded over an OR gate O31 to the back processors of the chain over the interface connection MO.-BUSY, whereby the signal $\overline{\text{PCON1}}$ can be superimposed in order to indicate that the internal processor is already concerned with a connection to the main memory.

M1.GO: This signal is transmitted by the main memory before the first validity character for simultaneously-transmitted read data and lasts until the overall read data transmission has been concluded. It is forwarded over the AND gate U33 to the back interface connection MO.GO when the status signal MCON1 of the control POZ-ST exists, i.e. when the received main memory data are to be forwarded to a following processor unit.

M1.STROBE: This signal transmitted from the main memory releases the simultaneously-transmitted read data for evaluation. It is forwarded over a pulse regeneration circuit R-ST to the following AND gate U31 at the back interface connection MO.STROBE when the AND gate U33 is simultaneously selected. By so doing, it is guaranteed that the validity characters are forwarded to the last processor units of the chain circuit only when one of such processor units, as an active processor, is the receiver.

M1.WHARDER: This is a matter of error signal which is transmitted by the main memory when error which cannot be eliminated has been perceived during a write operation. In the same manner as the validity signal, this error signal is regenerated by the pulse regenerator R-ST and is forwarded over an AND gate U32 at the corresponding, back interface connection MO.WHARDER, however, only when the AND gate U33 is not simultaneously selected.

All remaining interface signals transmitted by the main memory PMS, but not illustrated, are routed over an AND gate corresponding to the AND gate U33 depending on the status signals PCON1 or, respectively, MCON1 of the monitoring and assignment control POZ-ST in the same manner as the interface signal M1.GO, MO.GO depending upon whether these signals arise within the framework of the write operation of a read operation. Of the processor unit signals leading to the main memory PMS, only the interface line conducting the validity character and having the interface connections PO.STROBE and P1.STROBE are illustrated. Thereby, the connection of the two interface connections is produced by the control of the circuit STB-ST which, on the one hand, functions as a variable connector and either forwards, regenerated, the signal incoming to the interface terminal P1.STROBE when its own processor is not the last in the chain (this being indicated by the signal LIOP from the control POZ-ST) or, on the other hand, forwards a validity signal generated at the request of its own processor. Further details of the control circuit STB-ST shall be explained in detail below.

Because of the two possible sources, its own processor and the processor unit following in the chain, all remaining interface lines for processor signals leading to the main memory are respectively routed over variable connectors which are controlled depending on the status signals PCON1 and PCONO.

In addition to the interface terminals with their operations already discussed, only the interface terminal pair P1.TERM/PO.TERM is required for the execution of the present invention in order to indicate the end of a write operation in the preconnected interface controls DSY of the chain circuit. Within such an interface control, the two interface terminals are connected to one another over the control TERM-ST which likewise operates as a variable connector and either throughconnects the signal incoming to the terminal P1.TERM or, on the other hand, depending on the signals of the monitoring and assignment control POZ-ST, forwards an independently-generated signal. The control TERM-ST shall also be explained in greater detail below.

The other illustrated interface terminal pairs relate to additional control measures which are necessarily required for the memory traffic.

These are the interface terminals P1.REQUID and PO.REQUID which are linked to one another over a variable connector control ID-ST in order to transmit a recognition identifier to the main memory which is then again transmitted back over the interface line M.REQ-UID together with the error signal M1.WHARDER upon occurrence of a write error so that the error can be unequivocally assigned to the appertaining processor of the chain circuit. In this case, also, the recognition identifier to be forwarded in the one or the other direction is routed over a respective register L-REG4 or, respectively, L-REG3, whereby the intermediate storage in the forward direction, as in the case of the register L-REG2, depends on the control pulse LOADPLA and the intermediate storage in the return direction is dependent on a control pulse derived from the output of the AND gate U32 for the drive of the interface terminal MO.WHARDER.

A further additional control measure derives when the port is equipped for a LOCK MODE, i.e. is in a position to temporarily inhibit all other ports so that memory accesses can only be executed by the processor unit connected to this port. Therefore, the processor unit within the chain circuit executing a lock access must accordingly be protected against requests by the remaining processor units. In order to execute this protection, two additional interface lines within the chain circuit are required, namely, one for the request LOCK-REQ and one for the acknowledgment and inhibit report DSYLOCK. The terminals of both interface lines P1.LOCKREQ, PO.LOCKREQ, M1.DSYLOCK and MO.DSYLOCK are linked to one another over the control LOCK-ST.

The controls provided for the additional control measures are described more extensively below.

Figure 5:
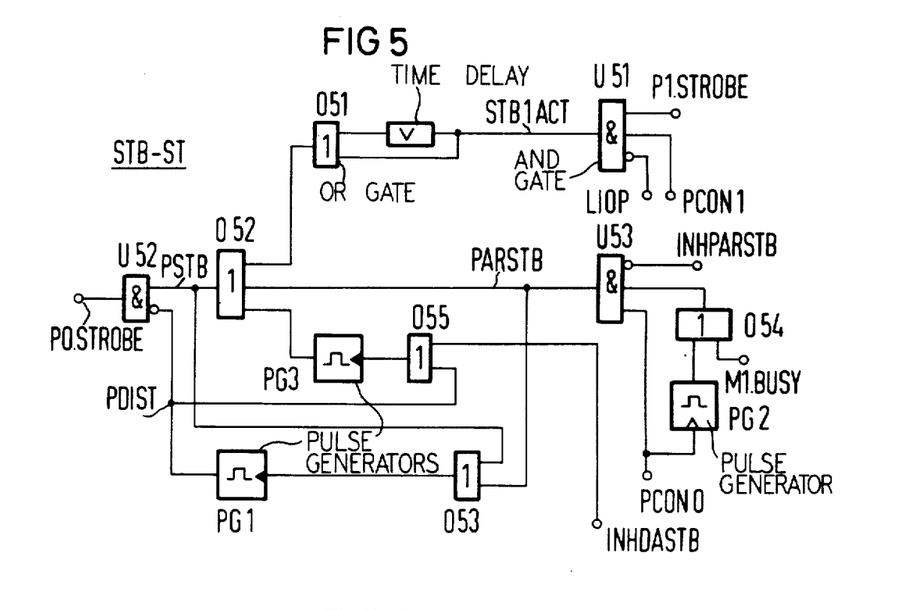
FIG. 5 is a circuit diagram of a circuit for generating the processor unit strobe pulses as validity characters for the transmission of data in conjunction with a switch control for retransmitting requests.

Referring first to FIG. 5, the circuit of the control STB-ST of FIG. 3 is illustrated. This control fulfills a total of four functions.

The first function consists in the variable connector control for the through connection of the external source signal P1.STROBE or of the source signal to be self-generated which is triggered simultaneously with the status signal PCONO. The two AND gates U51 and U53 which depend on the status signal PCON1 or, respectively, PCONO serve this purpose. Thereby, the gate U51 becomes transmissive for the external source signal P1.STROBE when the internal processor is not the last within the chain circuit and the signal LIOP, therefore, does not inhibit.

The signal STB1ACT generated at the output of the gate U51 is refreshed according to the second function of this control and, beginning with the second pulse, is brought to a prescribed keying ratio in that the signal is expanded by a time-delay element V and an OR gate O51 and is first received over an OR gate O52 and becomes a signal PSTB which passes through an uninhibited AND gate U52 to the output PO.STROBE. Further, the pulse generator PG1 is initiated with the trailing edge of the signal PSTB via an OR gate O53, the pulse generator PG1 then supplying a pause pulse PDIST of a predetermined length which inhibits the AND gate U52 so that a further signal pulse STB1ACT can only reach the output of the gate U52 at the conclusion of the pause pulse PDIST.

Figure 6:
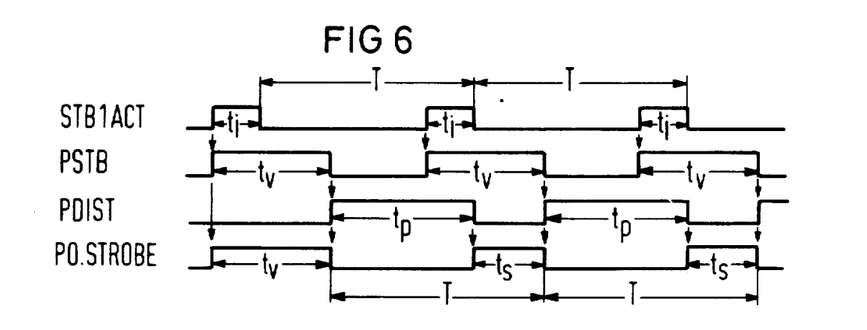
FIG. 6 is a pulse diagram relating to FIG. 5 as an aid in explaining the pulse regeneration process.

FIG. 6 illustrates an appertaining pulse diagram according to which pulses of the duration $t_i$ having a predetermined pulse spacing T are expanded to a pulse duration $t_v$ and, beginning with the second signal pulse of a sequence, are then brought to the reference duration $t_s$ given the same spacing P. For example, the control $R_{ST}$ illustrated in FIG. 3 for the PMS signals M1.STROBE and M1.WHARDER also functions in the same manner.

The third function of the control STB-ST is to generate a first parameter strobe pulse making the parameter data valid given a request of the internal processor which, given disconnection of the inhibit signal INHPARSTB releases the AND gate U53 for the status signal PCONO which at the same time influences the third signal input of the AND gate U53 over a pulse generator PG2 and an OR gate O54. Thereby, the pulse generator PG2 protects the transmissibility of the AND gate U53 for a minimum duration in case the further control signal M1.BUSY (whose significance shall be discussed below) is already a logical "0". Otherwise, over the OR gate O54, this signal determines the duration of the signal PARSTB which passes through the AND gate U52 to the output of the circuit as the signal PO.STROBE. At the end of this pulse PARSTB, the pulse generator PG1 is initiated over the OR gate O53 and the AND gate U52 is inhibited. Simultaneously, the inhibit signal INHPARSTB for inhibiting the AND gate U53 is again switched on in the processor interface control IOPSS-ST. Given a write operation (READ=0) this leads to the shutdown of the inhibit signal INHDASTB and, therefore, to the initiation of the fourth function of the control STB-ST, namely, generating write strobe pulses. With the cancellation of the inhibit signal INHDASTB, in particular, the OR gate O55 is released for the signal PDIST so that the pulse generator PG3 is started at the end of the pause pulse and a further pulse PO.STROBE for the transmission of a data word is generated via the OR gate O52 and the AND gate U52.

Depending on the type of write operation, either one write pulse or four successive write pulses are generated depending upon whether, for example, only one data word or, on the other hand, four data words are to be transmitted in the stream sequence. Therefore, the inhibit signal INHDASTB again becomes effective during the first write pulse and, if necessary, is again canceled when the acknowledgment is STREAMEN exists from the main memory PMS. Thereby, under certain conditions, a larger pulse can lie between the first and second write pulses. Otherwise, all four write pulses are generated following one another at uniform spacing by the interaction of the two pulse generators PG1 and PG3. The pulse generators PG1–PG3 can be designed in a manner known per se as signal edge-controlled one-shot multi-vibrators.

Figure 7:
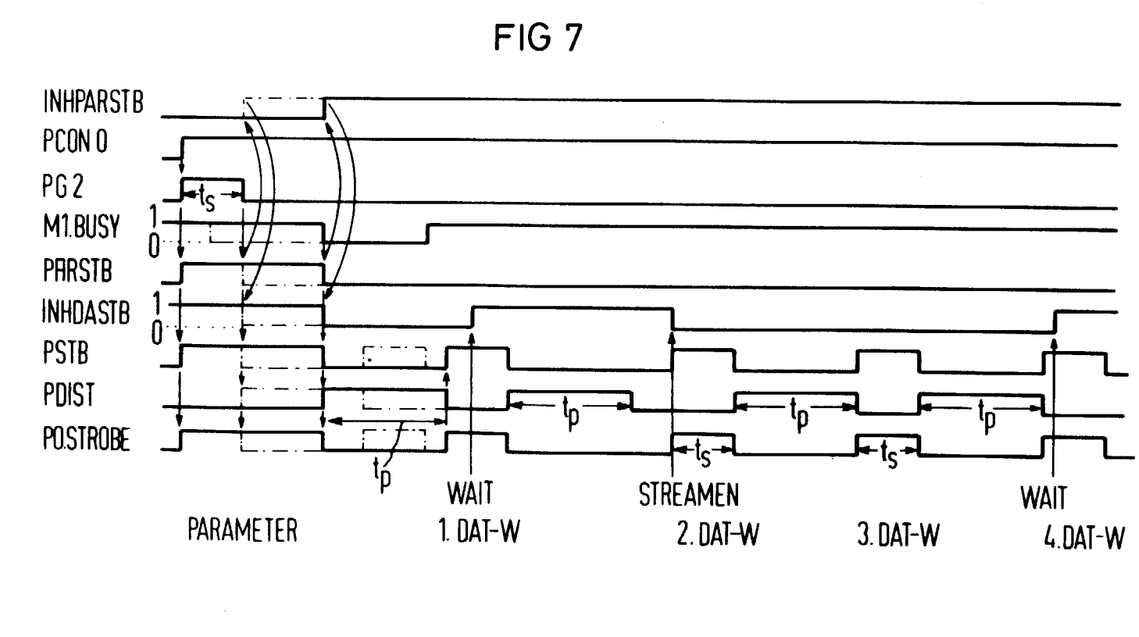
FIG. 7 is a pulse diagram relating to the circuit of FIG. 5 for explaining the strobe pulse generation.

FIG. 7 illustrates a corresponding pulse diagram whereby the influence of the signal M1.BUSY on the duration of the strobe pulse concerning the parameter strobe pulse is indicated in the first portion by dotted or, respectively, dot-dash lines. When the signal is already a logical "0" or when it ends before the useful life of the pulse generator PG2, then the duration is limited to the prescribed reference times $t_s$. In the other instance, the strobe pulse has a duration of corresponding length. Given a write operation having the predetermined spacing $t_p$, the first write strobe pulse having the duration $t_s$ follows correspondingly earlier or later, being followed by three further write strobe pulses with a mutual spacing $t_p$ under certain conditions, given the occurrence of the signal STREAMEN.

The corresponding control of the signal INHDASTB is schematically indicated in the portion of the processor interface control IOPSS-ST of FIG. 4. With READ=0, INHPARSTB=1 sets the flip-flop FF3 back over the gates U47 and O47, this being reset with WAIT. With STREAMEN, the flip-flop FF3 is again reset over the OR gate O47 and is then finally again set with a renewed signal WAIT.

In contrast thereto, the remaining controls illustrated in FIG. 3 have a significantly more simple structure.

Figure 8:
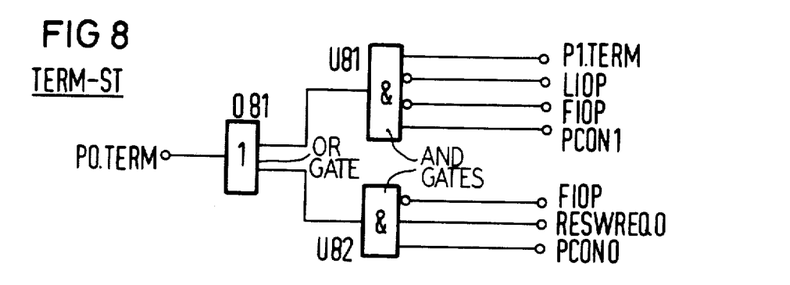
FIG. 8 is a circuit diagram of a switch control for terminating write operations as an addition to FIG. 3.

According to FIG. 8, the control TERM-ST comprises two AND gates U81 and U82 whose outputs are combined by way of an OR gate O81. The status signal PCON1 at the gate U81 controls the forwarding of the external source signal P8.TERM which is only possible when the internal processor is not the last (signal LIOP) and not the first (signal FIOP) processor within the chain, since this is only a matter of an internal interface signal of the chain circuit. At the AND gate U82, the status signal PCONO controls the forwarding of the signal RESWREQO indicating the end of write given internal request, whereby a forwarding is likewise only possible when it is not a matter of the first processor unit within the chain circuit.

Figure 9:
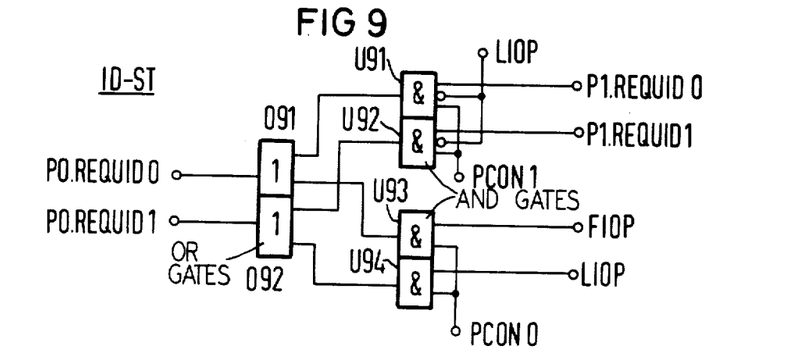
FIG. 9 is a circuit diagram of a switch control for generating a recognition identification as an addition to FIG. 3.

The variable connector control ID-ST illustrated in FIG. 9 is similarly constructed. Thereby, the two status signals PCON1 and PCONO respectively control two AND gates, namely the AND gates U91 and U92 or, respectively, U93 and U94 because two interface lines are to be controlled and the outputs of the AND gates are connected in pairs by the OR gates O91 and O92 to respectively one output. Since this is a matter of the recognition identifier, the intrinsic recognition identifier in the present case is directly derived from the signals FIOP and LIOP. When neither of the two signals is thereby effective, then, given a chain circuit of three processor units, the center processor unit, i.e. IOP1, is identified. When, in contrast thereto, both signals are simultaneously effective, then the chain is formed of only a single processor unit.

Figure 10:
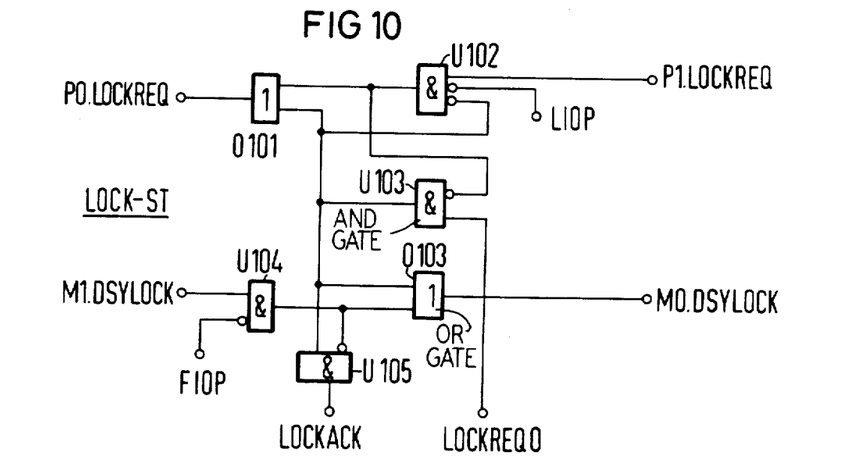
FIG. 10 is a circuit diagram of a lock control as an addition to FIG. 3.

Referring to FIG. 10, there is finally illustrated the request and inhibit control LOCK-ST for the execution of the lock mode. The presence of a request P1.LOCK or, respectively, LOCKREQO is monitored by the AND gates U102 and U103 which reciprocally inhibit so that only the first adjacent request is taken into consideration and is forwarded over the following OR gate O101 to the next concatenation stage when it is not a matter of a first processor unit of the chain circuit given which the request signal at the terminal PO.LOCK-REQ would proceed into the void. The oppositely extending interface line DSYLOCK indicates that the interface terminal M1.DSYLOCK whether a lock request already exists from a preconnected processor unit. When it is matter of the first processor unit of this chain, the AND gate U104 is always inhibited. The intrinsic request coming to bear at the output of the gate U103 and the inhibit of the gate U104 is continuously monitored at the output of the AND gate U105 and, when the corresponding output signal LOCKACK has lasted a predetermined minimum time, then this is evaluated as an acknowledgment of the fact that the intrinsic request has come to bear. Additionally, the output signals of the AND gates U104 and U103 are forwarded by way of the OR gate 0103 to the interface terminal MO.D-SYLOCK in order to inform the following processor units concerning the free of inhibited state.

In conclusion, the cooperation of the individual interface controls DSY within the chain, given the execution of memory operations between the last processor unit IO2 of the chain and the main memory PMS, will be explained in greater detail on the basis of FIG. 3, in conjunction with the pulse diagram of FIG. 11 and the pulse diagram of FIG. 12.

Given existence of a request, the same is reported with the signal LDREQ from the processor unit interface control IOPSS-ST and the status signal PCONO is set by the control POZ-ST (FIG. 4). According to FIG. 5, this leads to the generation of the interface signal PO.STROBE which is forwarded as a request signal over the interface SSD to the stage of the center processor unit IOP1 and is perceived there as a request P1.STROBE. When it is a matter of the only request within the chain, then, over the triggered status signal PCON1, the request is forwarded as the signal PO.-STROBE to the first processor IOP0 and, finally, after repetition of the same control sequence, is forwarded to the port of the main memory PMS where it ends as P.STROBE and declares the simultaneously co-transmitted parameter data PO.DATA, as well as the recognition identifier PO.REQUID being valid.

Figure 11:
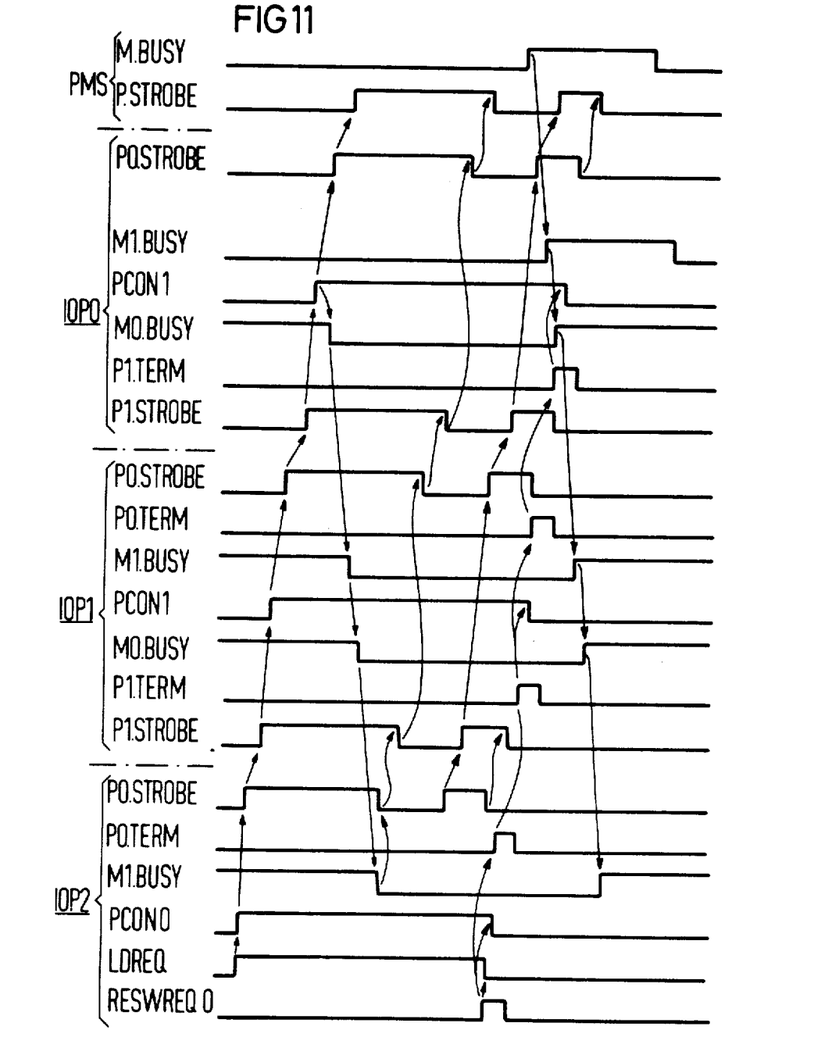
FIG. 11 is a pulse diagram for explaining the completion of connection and given initiation of a memory operation and for explaining a write operation.
Figure 12:
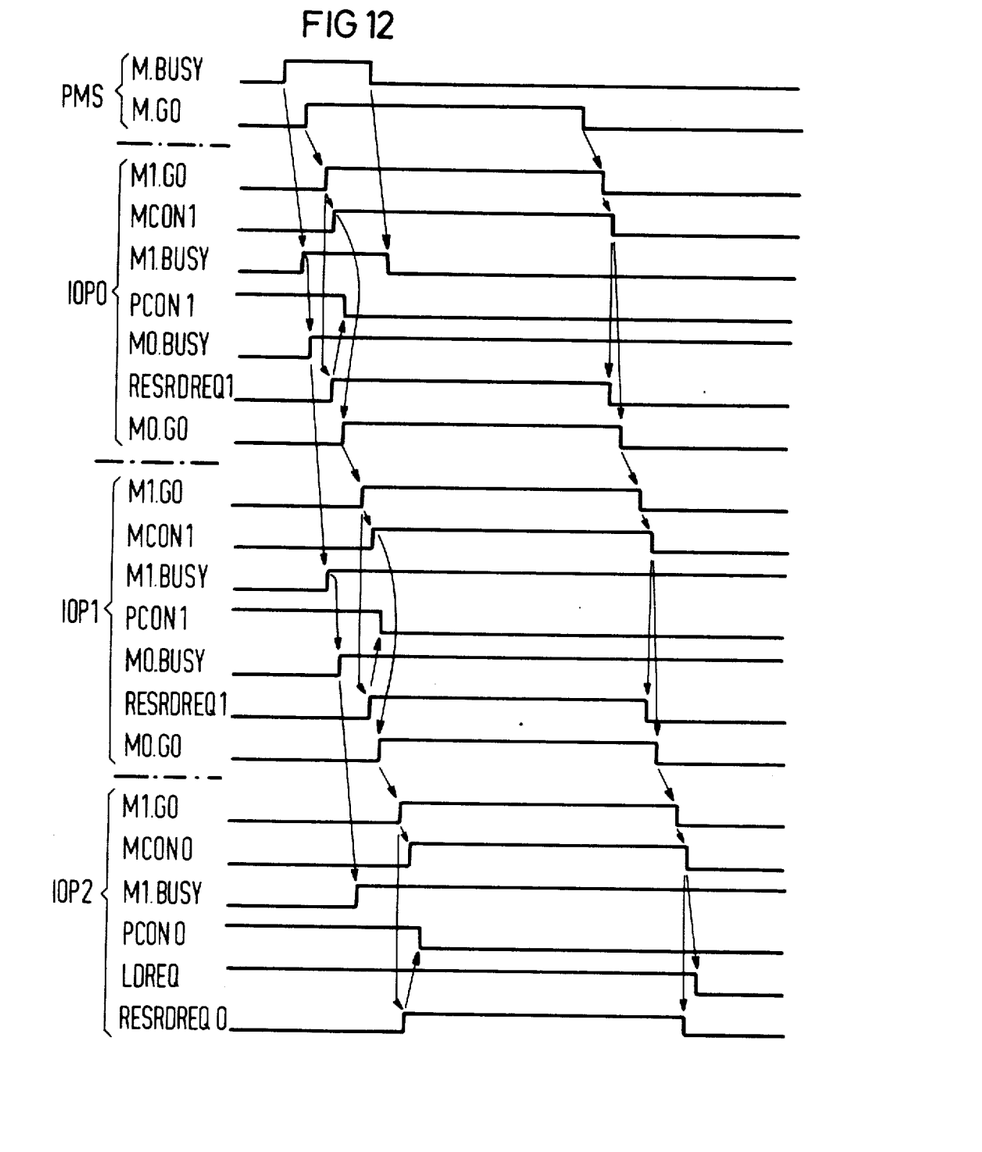
FIG. 12 is a pulse diagram for explaining a read operation.

This forwarding of the request is indicated in FIG. 11 by the left hand rising chain of arrows, whereby the time shifts are conditioned by the internal transit times and phasing times, as well as by the transmission times over the individual interfaces.

Proceeding from the memory PMS signal M.BUSY=0, the signal MO.BUSY=0 is transmitted backwards with the status signal PCON1 in the first processor IOP0, this arriving over the terminal M.BUSY, MO.BUSY of the second processor IOPY as an acknowledgment M1.BUSY=0 according to the first, descending chain of arrows at the requesting processor IOP1 and informing that processor unit that the connection to the main memory PMS is completed and that this is prepared for an interface operation.

According to FIG. 5, the acknowledgment M1.BUSY=0 leads to the termination of the request signal PO.STROBE at the last processor IOP2, this being propagated from stage to stage up to the main memory PMS in accordance with the second rising chain of arrows.

For a write operation, the active processor unit IOP2 is to control the strobe sequence so that, according to FIG. 5, a second pulse PO.STROBE is generated at a prescribed interval after the first strobe pulse PO.-STROBE, the second pulse PO.STROBE like the first pulse, being forwarded together with the appertaining data word to the main memory PMS. Depending on the type of write operation, the second strobe pulse can be followed by three further strobe pulses. The end of the write operation is reported by the processor unit interface control IOPSS-ST with the signal RESWREQO. In the assumed case, this end signal already follows after the second strobe pulse PO.STROBE given simultaneous disable of the request signal LDREQ and cancels the status signal PCONO (FIG. 4). Moreover, according to FIG. 8, the interface signal PO.TERM is formed which, as an end signal, again clears down the existing connection path within the chain circuit up to the first processor unit IOPO in that the status signal PCON1 is respectively canceled in the individual interface control DSY. The signal RESWREQO can also be cleared down, delayed in order, for example, to also await a PSM acknowledgment.

For the sake of completeness, it should also be pointed out that, in a manner known per se, each trailing edge of a strobe pulse PO.STROBE increases an address counter in the processor interface control IOPS-ST by one in order to supply the address for the next data word to be transmitted. The end signal RESWREQO is also expediently derived from this address counter.

Given a read operation, the completion of connection to the main memory PMS occurs on the basis of the signal LDREQ in the same manner as given a write operation, i.e. a request signal PO.STROBE is generated and transmitted together with the parameter data to the main memory. After disable of the strobe pulse, however, no further strobe pulses are generated as in a write operation but, rather, the active processor unit IOP2 waits for the transmission of the read data from the main memory PMS, this being indicated to the active processor unit by the signal M1.GO as an acknowledgment. This signal originates in the main memory PMS signal M.GO which reaches the first processor unit IOPO of the chain as the signal M1.GO. The status signal MCON1 is generated in the first processor unit and, therefore, the M.GO signal is forwarded as a signal MO.GO. Moreover, the status signal PCON1 is canceled with the successor signal RESRDREQ1. This sequence subsequently repeats according to the left, descending chain of arrows in FIG. 12 in the processor unit IOP1 and, finally, in the active processor IOP2. In the latter, however, there is the difference that the status signal MCONO and the signal RESRDREQO are generated and the status signal PCONO is canceled. With the setting of the status signals MCON1 or, respectively, MCONO, therefore, the path from the main memory PMS to the active processor IOP2 is completed and, simultaneously, with the cancellation of the status signals PCON1 or, respectively, PCONO in the individual chain stages, the connection path for the write request is released so that, parallel to the read data transmission, a new conduction path can be completed to the main memory PMS on the basis of the request of a different processor unit. The existing connection path from the main memory PMS to the active processor unit IOP2 is then only released again when the data read are completely transmitted and the PMS signal M.GO=0 appears, this being forwarded from stage-to-stage and again canceling the status signals MCON1 or, respectively, MCONO so that, finally, the signal RESRDREQ1 or, respectively, RESRDREQO again disappear, as shown by the second descending chain of arrows in FIG. 12.

During the transmission of the read data, again, only one strobe pulse M.STROBE or, on the other hand, four successive strobe pulses are transmitted together with the read data M.DATA depending on the type of read operation, whereby write pulses with which the data are entered under the respective address in the receiving buffer of the active processor unit IOP are formed from the strobe pulses in a manner known per se. So that the width of the valadity areas of the data to be through-connected and the position relative to the respective validity strobe remains approximately constant in the transmission of data from and to the main memory, the data M.DATA, P.DATA, REQUID in each chain stage, as already described on the basis of FIG. 3, are routed over so-called latch registers L-REG . . . and are released with control pulses derived from the accompanying validity signals MO.STROBE, PO.-STROBE or MO. WHARDER. Moreover, validity signals are respectively edited as described.

Overall, therefore, the concatenation of a plurality of processor units over the interface controls DSY according to the present invention individually assigned thereto leads to an extremely high performance and flexible arrangement with unaltered interface conditions at the memory port.

In order to allow the operational interrelationships of the individual signals to appear clearly in the individual drawings, an additional illustration of phasing clocks individually required and of intermediate circuits required for the chronological resolution has been foregone, since the realization of the necessary controls by one skilled in the art and active in the field is possible without further information on the basis of the foregoing discussion.

Although I have described my invention by reference to particular illustrative embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:
1. A data processing system comprising:
  a main memory including a port interface having a plurality of ports for connection to respective independent processing units;
  a plurality of processor units each including a processor unit interface, said processor unit interfaces connected in a chain with the processor unit interface of the first processor unit of the chain connected to one of said ports of said port interface, said processor units including identical interface controls operable to monitor and control said processor unit interfaces in both directions to and from said main memory;
  said interface controls each including means operable in mutual dependency on one another in response to access requests for said main memory from the processor units of the chain to connect a requesting processor unit to said one port and reciprocally inhibit the other processor units of the chain without addressing said one port as though only a single processor were connected to said one port; and
  said processor unit interfaces each including means operable to generate interface signals and variable connector controls for controlling memory traffic, including controlling access to said one port and controlling execution of a requested memory operation selectively in response to status signals and internally generated interface signals to forward signals through the chain to transmit signals of its own processor unit and to inhibit the other processor units.

2. The data processing system of claim 1, wherein said one port of said main memory interface provides free and busy state signals in accordance with its free and busy conditions, and wherein:

each of said processor unit interfaces comprises a plurality of interface lines, including a first interface line for carrying a validity character from a processor unit for the transmission of data from that processor unit to said main memory, a second interface line for carrying a status signal, and a third interface line coupled to said second interface line for receiving a free state signal from said one port of said main memory, and data lines;

each of said interface controls comprising monitoring means operating in accordance with the first in-last out principle to connect through the chain its own assigned processor unit or another processor unit in response to a respective first received access request signal from a respective processor unit, and means operable to generate status signals;

said variable connector controls including means operable in response to validity and status signals on said first and second interface lines to switch through said data lines; and said interface controls each further comprising means responsive to the connection of the requesting processor unit to release said second interface line proceeding backwards through the chain from the first processor unit of the chain in response to a busy state signal from said one port to the requesting processor unit, means responsive to the free state signal from said one port to disable the validity signal in a requesting processor unit and trigger a request and means responsive to said request to switch parameter data on said data lines.

3. The data processing system of claim 2, wherein:

each of said processor units comprises means operable to transmit write data to said one port over said data lines when said processor unit is connected through to said one port and operating as an active processor unit, means operable after the transmission of write data to transmit an end of write signal over an interface line to all intermediate processor units of the chain from the active processor towards said one port, and means responsive to the end of write signal to cancel the status signals indicating a busy port connection.

4. The data processing system of claim 2, wherein:

each of said processor units comprising means for transmitting a read request signal through the chain towards said one port when connected through to said one port and operating as an active processor unit, means for transmitting introductory data to said one port over said data lines to initiate data transmission from said main memory, means responsive to status signals of said monitoring means of said processor units which are intermediate said one port and an active processor to forward data read from the main memory, means for canceling status signals to clear the connection to said one port step-by-step through the chain, and means for canceling status signals set in the processor units in the connection path to the active processor unit in response to disablement of an interface signal at said one port.

5. The data processing system of claim 2, wherein:

each of said processor units further comprises means for regenerating and forwarding incoming validity signals, and means for intermediately storing received data in response to the regenerated validity signals.

6. The data processing system of claim 2, wherein:

each of said processor unit comprises two additional interface lines only in the chain of processor unit interfaces, a variable connector lock mode means interposed in said two additional interface lines which, in response to a lock mode at said one port permits access requests of individual processor units to become successively effective in the chain, including means responsive to a lock request from another processor unit to transmit an inhibit request over one of said additional interface lines and responsive to an internal lock request to transmit an inhibit signal over the other of said additional interface lines, and means operable in response to an internal lock request and to the lack of an inhibit signal on said additional interface line to trigger an acknowledgement signal and in response to an external lock request to forward the external lock request signal.

7. The data processing system of claim 2, wherein:

in order to identify the originating location of write errors occurring during a write operation and which is no longer locatable after clear down of the connection through the chain between an active processor unit and said one port, each of said processor units comprises means for transmitting a recognition identifier over an interface line with each access requests along with the parameter data transmitted on the interface data lines, said memory operable to retransmit the identifier with an error signal from said one port over other interface lines, and means for evaluating and regenerating error signals and the identifier, and register means for intermediately storing the error signals and the identifier.

8. The data processing system of claim 7, wherein:

each of said interface controls comprises first and second switches operable in response to said status signals to identify whether the respective processor unit is the first procesor unit or the last processor unit in the chain and to prevent interface lines from becoming effective when no interface lines are connected through.

9. The data processing system of claim 8, wherein:

three processor unit interfaces are connected to form the chain, and said switches are connected to and operate by the end of chain identifiers on two of said interface lines.

* * * * *